Patented Nov. 29, 1949

2,489,357

UNITED STATES PATENT OFFICE 2,489,357

BENZOTRIAZINES

Frank J. Wolf, Westfield, and Karl Pfister, III, Elizabeth, N. J., assignors to Merck & Co., Inc., Rahway, N. J., a corporation of New Jersey No Drawing. Application January 10, 1947, Serial No. 721,474

6 Claims. (Cl. 260—248)

This invention relates to new organic chemical compounds possessing therapeutic activity, and to methods by which they may be prepared from readily available starting materials. More particularly the invention relates to the preparation of 7-halogen-3-hydroxy-benzotriazine-1,2,4 compounds, and to the chemical compounds so produced, which are useful intermediates in the preparation of complex organic compounds including antimalarial agents and dyes.

The new compounds of the present invention are prepared from 7-halogen-3-hydroxy-benzotriazine-1,2,4-oxide-1 compounds which can readily be obtained by reacting a 4-halogen-2-nitroaniline with phosgene in organic solvent solution, treating the reaction mixture thus obtained with anhydrous ammonia to form the corresponding 4-halogen-2-nitrophenylurea, reacting this product with sodium hydroxide and then acidifying to precipitate the desired product, as fully described in our companion application Serial No. 721,470 filed January 10, 1947.

In carrying out the process of the present invention a 7-halogen-3-hydroxy-benzotriazine-1,2,4-oxide-1 is reacted with equimolecular quantities of zinc dust and ammonium chloride in aqueous solution. The reaction is preferably carried out at about 30° C. at which temperature the reduction is completed in about 18 hours.

The product which precipitates is filtered off, dissolved in aqueous alkali, and filtered. Upon neutralizing the filtrate with dilute acid 7-halogen- 3-hydroxy-benzotriazine-1,2,4 separates as a yellow precipitate. The 7-chloro compound upon recrystallization from Cellosolve, melts at 220–222° C.

This reaction can be illustrated as follows:

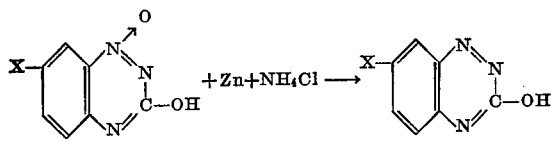

wherein X is halogen.

An alternate method for preparing the desired compounds is by diazotization of a 7-halogen-3-amino-benzotriazine-1,2,4 which can readily be obtained by reduction of a 7-halogen-3-amino-benzotriazine - 1,2,4 - oxide - 1 as disclosed in our pending application Serial No. 661,083, filed April 10, 1946. The oxide can, in turn, be prepared by reacting a 4-halogen-2-nitroaniline with cyanamide and treating the resulting guanidine derivative with alkali, as fully disclosed in our pending application Serial No. 661,084, filed April 10, 1946.

The diazotization is preferably carried out by reacting a 7-halogen-3-amino-benzotriazine-1,2,4 in strong (i. e., 50%) sulfuric acid solution with sodium nitrite at a temperature not in excess of room temperature and adding the reaction mixture to water to form a precipitate of the 7-halogen - 3 - hydroxy-benzotriazine-1,2,4. Phosphoric acid can be added in the reaction but is not absolutely necessary. When the product is recrystallized from Cellosolve it has the same melting point as the corresponding product obtained by the first synthesis above mentioned.

The following examples show how processes of the present invention can be carried out, but it is to be understood, that these examples are given by way of illustration and not of limitation.

Example 1

Ten grams of 7-chloro-3-amino-benzotriazine-1,2,4 is dissolved in 350 ml. of 50% sulfuric acid and cooled to 0° C. Then 3.5 gms. of sodium nitrite is slowly added and the mixture is allowed to stand for 15 minutes at room temperature. The solution is poured into water and the resulting precipitate filtered. The yellow precipitate of 7-chloro-3-hydroxy-benzotriazine - 1,2,4 is recrystallized from Cellosolve, M. P. 220–222° C.

Example 2

A suspension of 10 g. of 7-chloro-3-amino-benzotriazine-1,2,4 in 50 ml. of concentrated sulfuric acid was cooled to 0° and a previously cooled solution of 3.5 g. of sodium nitrite in 25 ml. of concentrated sulfuric acid added slowly to the cooled suspension. After the addition was complete, 75 ml. of 85% phosphoric acid was slowly added keeping the temperature below 20° C. After standing in an ice bath for 15 minutes the solution was poured into 400 g. of ice and water causing precipitation of 3.0 g. (30% yield) of 7-chloro - 3 - hydroxy-benzotriazine-1,2,4. After recrystallization from Cellosolve, this product melted at 222° C. (dec.).

Example 3

Four grams of 7-chloro-3-hydroxy-benzotriazine-1,2,4-oxide-1, is stirred with 1.56 gms. of zinc dust and 1.08 gms. of ammonium chloride in 100 cc. of water for 18 hours at room temperature (30° C.). At the end of this time, the material is filtered. The crude precipitate is dissolved in 5% NaOH and filtered. Acidifying with 2.5N hydrochloric acid gives a yellow precipitate of 7-chloro-3-hydroxy-benzotriazine-1,2,4 which is filtered off. The yield is 3.2 gms., 82.5% of the theoretical, M. P. 214–16° C. Upon recrystallization from Cellosolve, a melting point of 220–2° C. is obtained. This is identical to the compound obtained in Examples I and II.

Modifications can be made in the foregoing procedures without departing from the spirit and scope of the present invention, and we are to be limited only by the appended claims.

We claim:

1. 7-halogen-3-hydroxy-benzotriazine-1,2,4.
2. 7-chloro-3-hydroxy-benzotriazine-1,2,4.
3. The process that comprises reacting 7-halogen-3-hydroxy-benzotriazine-1,2,4-oxide-1 with zinc dust and ammonium chloride in aqueous medium, and recovering the 7-halogen-3-hydroxy-benzotriazine-1,2,4 thus formed.
4. The process that comprises reacting 7-chloro-3-hydroxy-benzotriazine-1,2,4-oxide-1 with zinc dust and ammonium chloride in aqueous medium, and recovering the 7-chloro-3-hydroxy-benzotriazine-1,2,4 thus formed.
5. The process that comprises reacting 7-halogen-3-hydroxy-benzotriazine-1,2,4-oxide-1 with zinc dust and ammonium chloride in aqueous medium, separating the precipitate thus formed and dissolving the same in dilute aqueous alkali and acidifying the alkaline solution to precipitate the corresponding 7-halogen-3-hydroxy-benzotriazine-1,2,4.
6. The process that comprises reacting 7-chloro-3-hydroxy-benzotriazine-1,2,4-oxide-1 with zinc dust and ammonium chloride in aqueous medium, separating the precipitate thus formed and dissolving the same in dilute aqueous alkali and acidifying the alkaline solution to precipitate the corresponding 7-chloro-3-hydroxy-benzotriazine-1,2,4.

FRANK J. WOLF.
KARL PFISTER, III.

REFERENCES CITED

The following references are of record in the file of this patent:

UNITED STATES PATENTS

| Number | Name | Date |
|---|---|---|
| 2,197,357 | Widmer | Apr. 16, 1940 |

OTHER REFERENCES

Bischler Berichte 22 1889, pp. 2817–2818, 2806.
Arndt Berichte 50 1917, pp. 1248–1261.
Parkes, Chem. Soc. J. 1938, pp. 1842–1843.